J. E. BERGSTROM.
SCUFFLE HOE AND GARDEN TRIMMER.
APPLICATION FILED SEPT. 27, 1912.
1,052,789.
Patented Feb. 11, 1913.
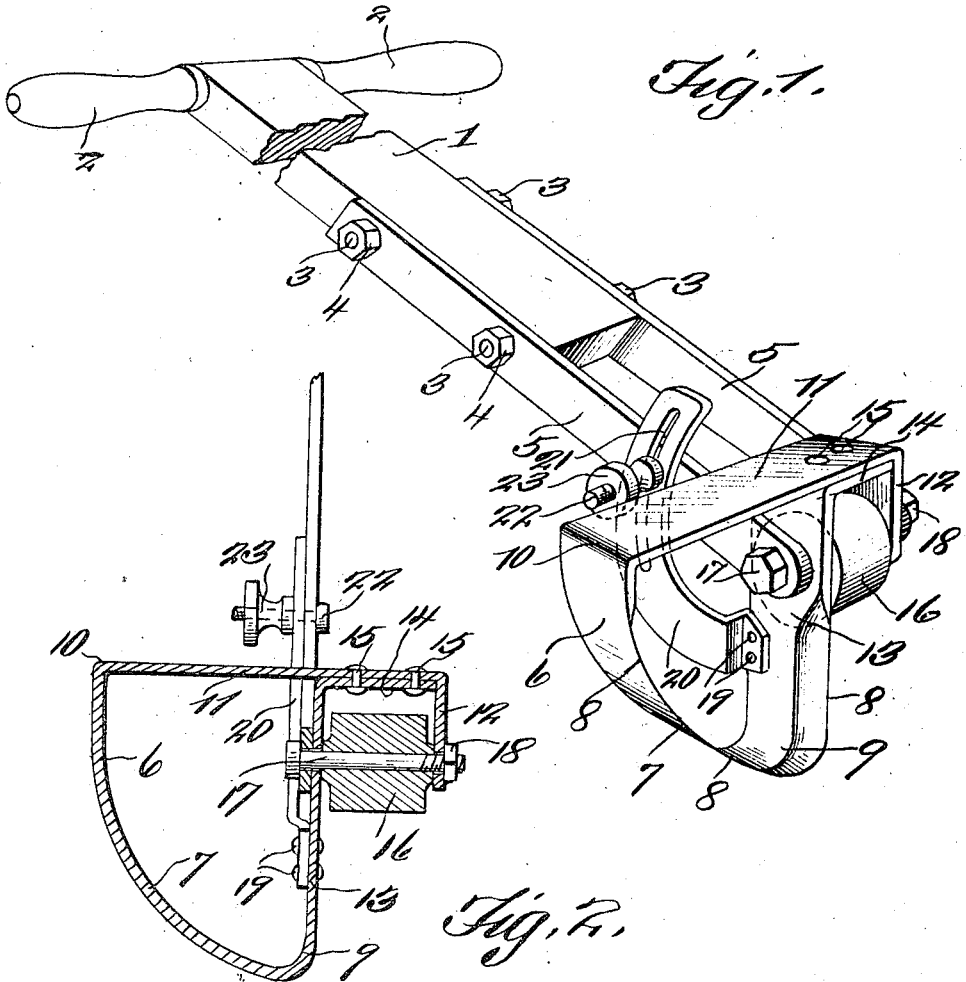
Witnesses
Inventor
John E. Bergstrom,
By D. Swift & Co.
his Attorneys

UNITED STATES PATENT OFFICE.

JOHN E. BERGSTROM, OF ROCK ISLAND, ILLINOIS.

SCUFFLE-HOE AND GARDEN-TRIMMER.

1,052,789.

Specification of Letters Patent. Patented Feb. 11, 1913.

Application filed September 27, 1912. Serial No. 722,749.

*To all whom it may concern:*

Be it known that I, JOHN E. BERGSTROM, a citizen of the United States, residing at Rock Island, in the county of Rock Island and State of Illinois, have invented a new and useful Scuffle-Hoe and Garden-Trimmer; and I do hereby declare the following to be a full, clear, and exact description of the invention, such as will enable others skilled in the art to which it appertains to make and use the same.

This invention relates to a new and useful garden hoe, for trimming the ground and sod adjacent side walks and the like.

One of the objects of the invention is the provision of a device of this nature having improved and novel features of construction, as hereinafter set forth, shown in the drawings and claimed.

In the drawings:—Figure 1 is a view in perspective of the improved garden hoe or tool, constructed in accordance with the invention. Fig. 2 is a sectional view on line 2—2 of Fig. 1.

Referring more particularly to the drawings 1 designates a bar having laterally projecting handles 2 at its upper end. Secured to the bar 1 at its lower portion, by means of the bolts and nuts 3 and 4 are two metallic bars 5. A hoe plate 6, consisting of a metallic bar, constructed or shaped to form a curved portion or hoe blade proper 7 having a cutting edge 8, is provided. This hoe plate bar is also constructed with an abrupt curve 9, so as to cut the soil or sod in order to leave it with a neat appearance. The hoe plate or bar is bent at 10 to form a horizontal portion 11, the end portion of which is bent downwardly and designated by the numeral 12. The vertical portion 13 of the hoe plate terminates in a horizontal portion 14, against which the horizontal portion 11 is secured by the rivets 15. Between the portions 13 and 12 a filler block 16 is arranged, there being a bolt 17 extending through the lower ends of the bars 5, the portions 12 and 13 and the filler block 16. A nut 18 is threaded upon the bolt 17, to hold said parts together securely.

Riveted or otherwise secured at 19 to the vertical portions 13 of the hoe plate is a segment bar 20 having a slot 21. Passing through one of the bars 5 and the slot 21 is a bolt 22, on which a thumb nut 23 is threaded. By loosening and tightening said nut, the hoe plate may be adjusted and held adjusted in desired positions, whereby the ground or soil may be trimmed with precision, so as to leave it with an exceedingly neat appearance.

The invention having been set forth, what is claimed as new and useful is:—

1. In combination, a handle bar having two bars bolted in parallel relation to the lower end of said handle bar, said parallel bars being spaced apart, a hoe plate constructed with a curved portion having a knife edge, said plate having a vertical and horizontal portion converging toward one another, said vertical and horizontal portions terminating in extensions riveted together, the extension of the horizontal portion being turned downwardly, said vertical and downwardly turned portion being arranged between the lower ends of said parallel bars, a filler block between said vertical portion and the downwardly turned portion, means for fastening said parts together, and means for holding the hoe plate in adjusted positions relative to the parallel bars.

2. In combination, a handle bar having two bars bolted in parallel relation to the lower end of said handle bar, said parallel bars being spaced apart, a hoe plate constructed with a curved portion having a knife edge, said hoe plate being constructed with converging parts to be pivoted between the spaced apart lower ends of said parallel bars, a filler block between the spaced apart ends of said parallel bars, a bolt passing through the lower ends of said bars, the converging parts and the filler block, for pivoting the hoe plate in place, and means for holding the hoe plate in pivotal adjusted positions.

In testimony whereof I have signed my name to this specification in the presence of two subscribing witnesses.

JOHN E. BERGSTROM.

Witnesses:
LOUIS KOHN,
R. E. SWANSON.